United States Patent [19]
Nelson

[11] Patent Number: 6,050,762
[45] Date of Patent: Apr. 18, 2000

[54] NON HANDED LATCH FOR FREIGHT CONTAINER PINLOCK

[75] Inventor: Jim Nelson, Saint Augustine, Fla.

[73] Assignee: Buffers USA Inc., Jacksonville, Fla.

[21] Appl. No.: 09/302,497

[22] Filed: Apr. 30, 1999

Related U.S. Application Data

[60] Provisional application No. 60/083,749, May 1, 1998.

[51] Int. Cl.[7] ....................................................... B60P 7/08
[52] U.S. Cl. .................................. 410/76; 410/77; 410/81
[58] Field of Search .................................... 410/69, 76, 77, 410/80, 81, 73; 292/33, 183, 184; 248/500, 503

[56] References Cited

U.S. PATENT DOCUMENTS

| | | | |
|---|---|---|---|
| 4,352,517 | 10/1982 | Bertolini | 410/81 X |
| 4,486,132 | 12/1984 | Schulz et al. | 410/81 |
| 5,575,599 | 11/1996 | Conlee et al. | 410/69 |
| 5,839,864 | 11/1998 | Reynard | 410/76 X |

*Primary Examiner*—Stephen T. Gordon
*Attorney, Agent, or Firm*—Browdy and Neimark

[57] ABSTRACT

The invention is directed to a front bolster pinlock device for attachment to either end of a front bolster beam of a chassis for engaging and transporting a freight container. To accomplish this the pinlock device has a housing adapted to be fixed to said front bolster beam. A first side wall having a slot which extends away from the front bolster beam and the locking pin is slidably engaged in the housing. A handle is fixed to the locking pin slidable in the first slot. A latch having a second slot is rotatably engaged to said side wall and the handle extends through the second slot. When the locking pin is engaged to the freight container the gravity latch maintains the handle in a locked position when the device is fixed at either end of said front bolster beam, in spite the fact that the devices are rotated 180 degrees in relation to each other to their operational position with the handles pointing towards each other.

13 Claims, 2 Drawing Sheets

NON HANDED LATCH FOR FREIGHT CONTAINER PINLOCK

This application is based on provisional application 60/083,749 filed May 1, 1998.

BACKGROUND OF THE INVENTION

1. Field of the Invention

A front bolster pinlock on a road chassis having a gravity latch that is designed to lock the pinlock to a freight container carried on the chassis regardless of whether the pinlock is fixed on the left side or turned 180° and fixed on the right side of the chassis.

2. Prior Art

Road chassis for transporting freight containers has commonly been used since the early 1960s. The most typical model is the so called gooseneck chassis that has two twistlocks at the rear and two pinlocks at the front to engage a freight container for transport. The twistlocks are operated from underneath the container but the pinlocks at the front of the chassis are operated from opposite sides of the chassis from the front of the container due to lack of space under the front of the chassis. More specifically, each pinlock is fitted within a front beam called a bolster which is in front of the freight container to be transported. This arrangement requires fixing a handle to each pinlock which extends to the nearest adjacent side of the chassis to permit operation of the pinlocks. Each bolster has different sizes depending on the manufacturers individual designs but space is restricted to the overall size and weight of the chassis making the handles at the sides necessary. Attempts to reduce weight and cost have encouraged development of both twistlocks and pinlocks as well as other parts of the chassis. However, the manufacturers have been forced to keep both lefthand and right hand pinlocks in stock so that they can be operated from either side of the chassis. Further, separate latches need to be welded onto the bolster profile in a position so that they can lock or latch down the handle of both of the pinlocks when engaged to the freight container to prevent disengagement during road transportation.

OBJECT AND SUMMARY OF THE INVENTION

The object of the invention is to reduce cost by reducing fitting time and reduce manufacturing cost by only having to make one universal pinlock which has a latch engaged to the pinlock housing instead of making one left handed and one right handed type and then positioning separate latches on the chassis. Having one type that fits both sides of the chassis also reduces the risk to the manufacturer of being either under or over stocked.

The gravity latch is designed to hold the handle, which is fixed perpendicular to a locking pin, in locked position when the pin is fully extended into a locked position to engage the container for transport. To retract the locking pin, the gravity latch is lifted upwards and the handle engaged to the locking is pulled back into slots in the latch and the housing allowing the locking pin to retract to an open position disengaged from the container.

Thus, the invention has a latch that is fitted to the pinlock housing eliminating the need for any separate latch being welded onto the chassis. Furthermore, the latch has a double sided design that makes the lock non handed. There is no upside or downside on the pinlock so that when fitted on one side of the chassis it rotates 180° to fit the other side of the chassis. The latch therefore can be used on either side due to its double sided design. The latch is of the gravity type and operates vertically when installed on the pinlock house in the bolster beam. It is held to the pinlock by means of a pivot bolt that also works as the hinge point when the latch is operated.

DETAILED DESCRIPTION OF THE PREFERRED EMBODIMENT(S) OF THE INVENTION

Figure 1:
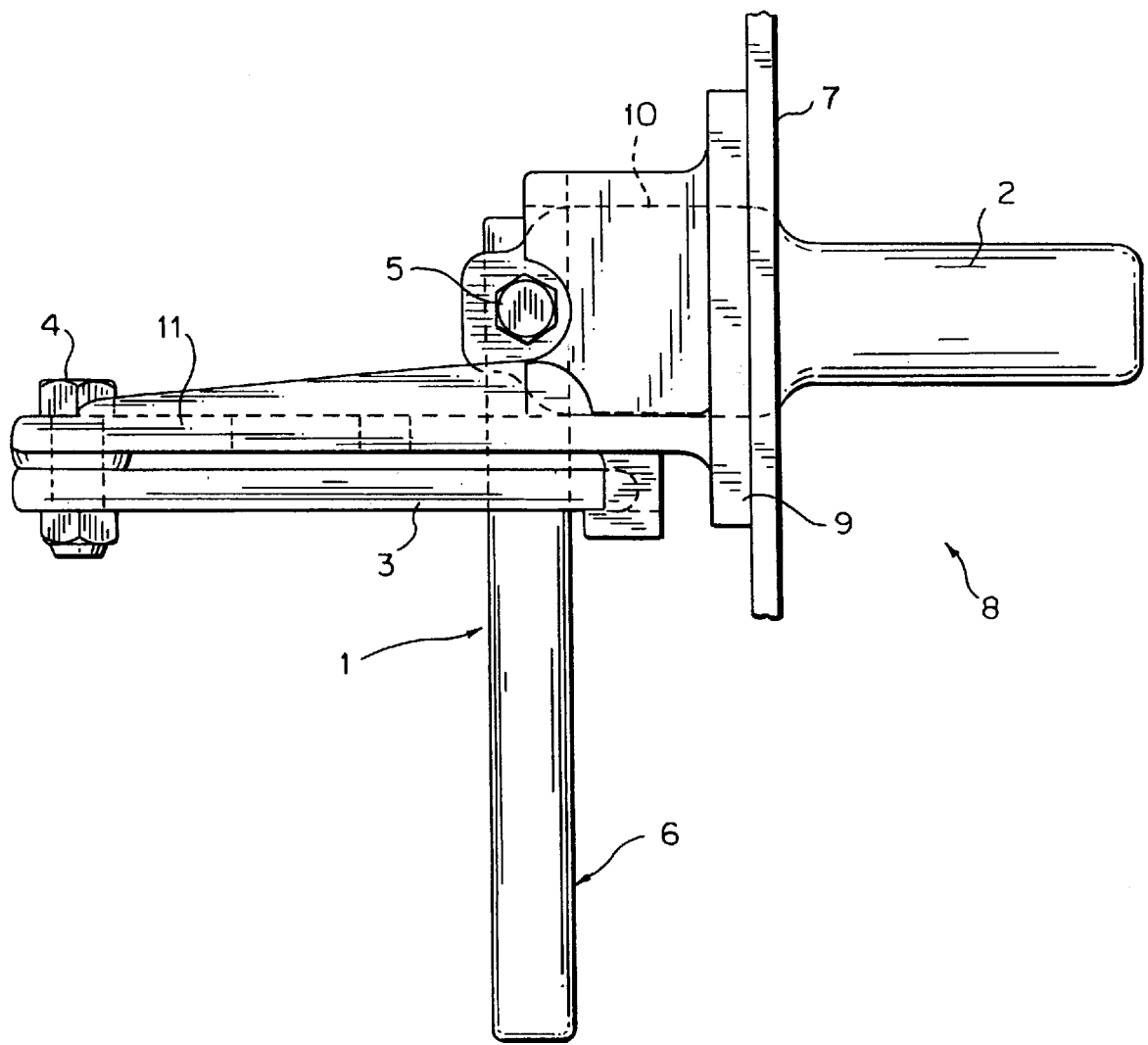
FIG. 1 is a plane view of the front bolster pinlock according to the invention engaged to a front bolster on a road chassis.
Figure 2:
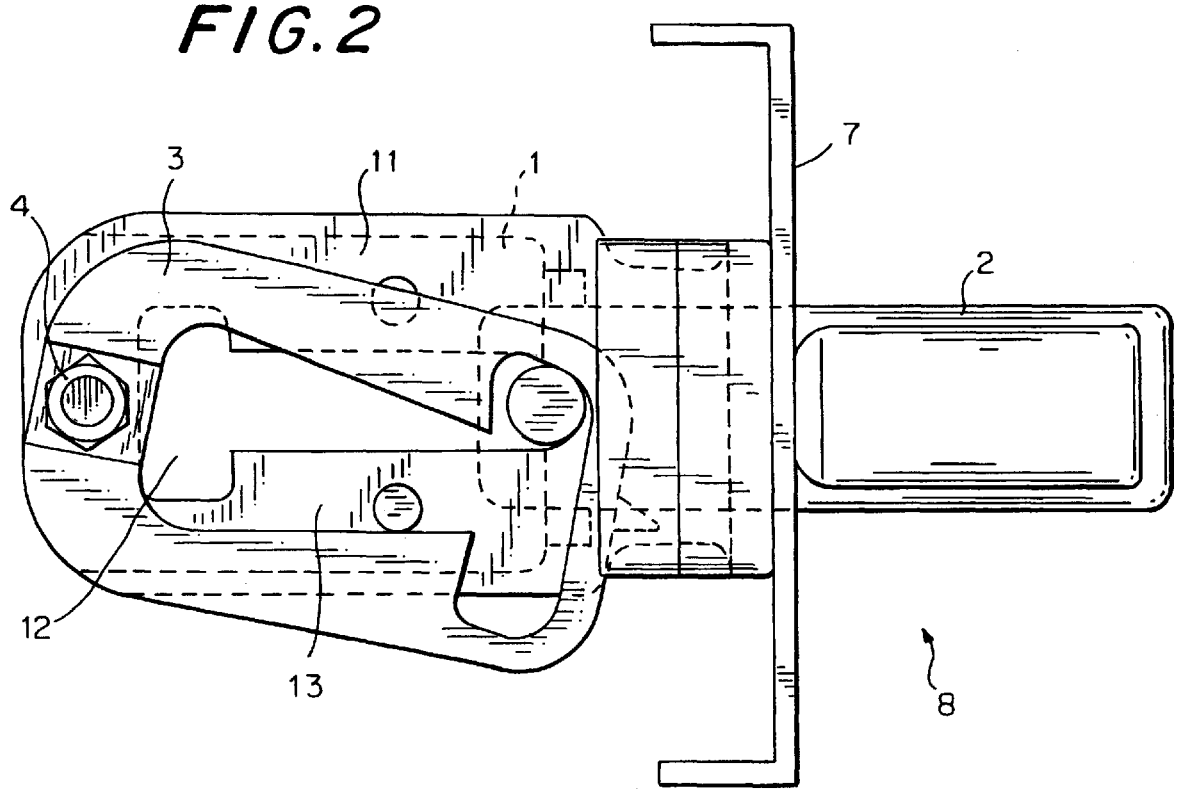
FIG. 2 is a side elevation view of the invention shown in FIG. 1.
Figure 3:
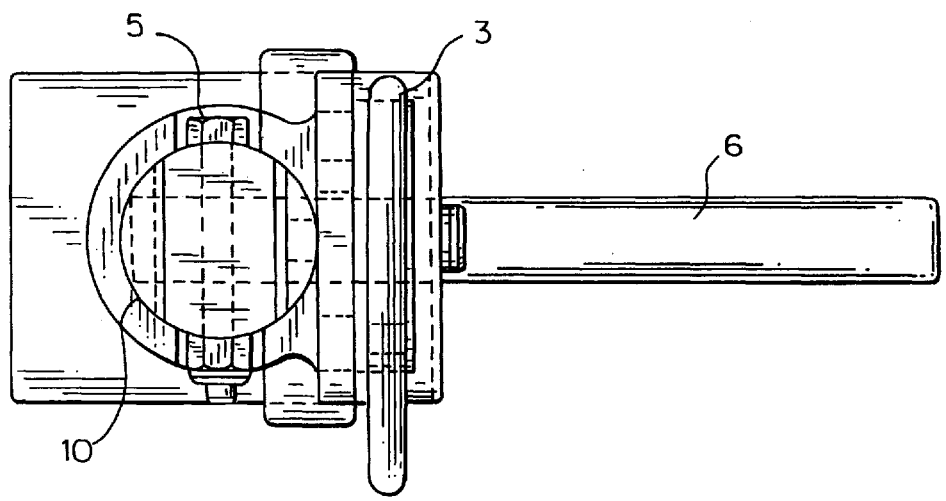
FIG. 3 is a rear elevation view of the invention shown in FIG. 2.

FIGS. 1–3 of the drawings show a front bolster pinlock 1 fixed by welding or otherwise to the front bolster beam 7 of a chassis for transporting freight containers 8. In this position it is understood that handle 6 of pinlock 1 extends toward the transversal center of the chassis so that an operator of the pinlock 1 has easy access. The front bolster pinlock 1 comprises a pin 2 which engages container 8 when in a locked position. Pin 2 is operated by handle 6 which is fixed perpendicularly to pin 2 by bolt 5 fastened to a nut. Pin 2 and handle 6 are slidably engaged in housing 9 which is the portion of pinlock 1 which is fixed to bolster beam 7 at its front wall. As shown in the FIGS. 1–3, housing 9 has a through hole 10 having a diameter which correspond to the diameter of the end of pin 2 fixed to arm 6. When operated, pin 2 slides in through hole 10 to its final engaged or disengaged position. Housing 9 also has an integral side wall 11 having a T-shaped slot 12 in which arm 6 slides when pin 2 is operated. Accordingly, handle 6 can be moved toward container 8 to engage pin 2 to the container 8 or away from container 8 to disengage pin 2 from container 8 while both pin 2 and arm 6 are slidably retained in housing 9.

Handle 6 is maintained in a locked or engaged position by latch 3. Latch 3 is rotatably attached on side wall 11 of housing 9 by nut and bolt 4 shown in FIG. 2. A T-shaped slot 13 in latch 3 is designed to lock handle 6 in an engaged position when front bolster pinlock is engaged to the freight container at either of the opposite ends of bolster beam 7. Thus, whichever end of beam 7 pinlock 1 is fitted to, with handle 6 extending toward the transversal center of the chassis, latch 3 will rotate by gravity into engagement with handle 6.

The foregoing description of the specific embodiments will so fully reveal the general nature of the invention that others can, by applying current knowledge, readily modify and/or adapt for various application such specific embodiments with out departing from the generic concept, and therefore such adaptations and modifications are intended to be comprehended within the meaning and range of equivalents of the disclosed embodiments. It is to be understood that the phraseology or terminology herein is for the purpose of description and not of limitation.

I claim:

1. A front bolster pinlock device for attachment to a front bolster beam of a chassis for engaging and transporting a freight container, said pinlock device comprising:

a housing adapted to be fixed to either end of said front bolster beam;

a first side wall having a first slot extending away from said front bolster beam;

a locking pin slidably engaged in said housing;

a handle fixed to said locking pin, said handle being slidable in said first slot;

a latch rotatably engaged to said side wall and having a second slot;

said handle extending through said second slot;

wherein, when said locking pin is engaged to said freight container said latch maintains said handle in a locked position; and wherein said latch is adapted to operate at either end of said front bolster beam.

2. The device according to claim 1, wherein said device is turnable by 180° so as to operate at either end of said front bolster beam.

3. The device according to claim 1, wherein said first slot is T-shaped.

4. The device according to claim 1, wherein said second slot is T-shaped.

5. The device according to claim 1, wherein a longitudinal axis of said handle is substantially perpendicular to a longitudinal axis of said locking pin.

6. The device according to claim 1, wherein a longitudinal axis of said first slot is perpendicular to a front wall of said housing.

7. The device according to claim 6, wherein said front wall is adapted to be welded to said front bolster beam.

8. The device according to claim 1, wherein a cross section of a locking end of said locking pin is substantially rectangular.

9. The device according to claim 1, wherein an end of said locking pin is fixed to said handle and has a circular cross section which is slidably engaged in a corresponding through hole in said housing.

10. The device according to claim 1, wherein said first side wall is longer than other side walls of said housing.

11. The device according to claim 1, wherein a longitudinal length of said latch is substantially equal to a longitudinal length of said first side wall.

12. The device according to claim 1, wherein sides of said latch are vertical to ground when said device is fixed to said front bolster beam, and said latch rotates by gravity around a pivot engaged to said first side wall.

13. The device according to claim 10, wherein at least one of said other side walls is cylindrical.

\* \* \* \* \*